United States Patent
Shah et al.

(10) Patent No.: US 11,736,594 B2
(45) Date of Patent: Aug. 22, 2023

(54) LOW-LATENCY FPGA FRAMEWORK BASED ON RELIABLE UDP AND TCP RE-ASSEMBLY MIDDLEWARE

(71) Applicant: Tata Consultancy Services Limited, Mumbai (IN)

(72) Inventors: Dhaval Shah, Thane West (IN); Sunil Puranik, Pune (IN); Manoj Nambiar, Thane West (IN); Mahesh Damodar Barve, Pune (IN); Ishtiyaque Shaikh, Thane West (IN); Piyush Manavar, Thane West (IN); Sharyu Vijay Mukhekar, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 141 days.

(21) Appl. No.: 17/349,085

(22) Filed: Jun. 16, 2021

(65) Prior Publication Data

US 2022/0311839 A1 Sep. 29, 2022

(30) Foreign Application Priority Data

Feb. 19, 2021 (IN) .......................... IN202121007086

(51) Int. Cl.
 *G06F 15/173* (2006.01)
 *H04L 69/16* (2022.01)
(52) U.S. Cl.
 CPC .................... *H04L 69/16* (2013.01)
(58) Field of Classification Search
 CPC ....... H04L 69/16; H04L 1/1628; H04L 69/12; H04L 69/163; H04L 69/164; H04L 69/165; H04L 69/166

(Continued)

(56) References Cited

U.S. PATENT DOCUMENTS

2016/0344629 A1* 11/2016 Gray .................... H04L 49/106
2020/0053004 A1* 2/2020 Nambiar ............... H04L 69/164

FOREIGN PATENT DOCUMENTS

CN 107392768 A 11/2017

OTHER PUBLICATIONS

John W. Lockwood et al., "A Low-Latency Library in FPGA Hardware for High-Frequency Trading (HFT)", 2012 IEEE 20th Annual Symposium on High-Performance Interconnects. (Year: 2012).*

(Continued)

*Primary Examiner* — Vivek Srivastava
*Assistant Examiner* — Karina J Garcia-Ching
(74) *Attorney, Agent, or Firm* — Finnegan, Henderson, Farabow, Garrett & Dunner, LLP (57) ABSTRACT

A method and system of a low-latency FPGA framework based on reliable UDP and TCP re-assembly middleware is disclosed. The need for low-latency communication in digital systems has increased drastically. The disclosed FPGA framework enables low-latency communication as a hybrid framework that supports both UDP & TCP communication. As known in art, TCP provides error checking support hence making TCP more reliable as compared to UDP, while UDP is faster but not reliable. Hence the disclosed low-latency FPGA framework latency utilizes the advantage of both UDP and TCP by utilizing UDP for its speed, while switching to TCP in case of a missing sequence in UDP. Further, the disclosed system proposes a TCP re-assembly middleware architecture for processing TCP with a lower-latency, wherein the TCP re-assembly middleware is an independent middleware that is a modular and a plug-play independent middleware.

12 Claims, 7 Drawing Sheets

(58) Field of Classification Search
USPC .......................................................... 709/238
See application file for complete search history.

(56) References Cited

OTHER PUBLICATIONS

Christian Leber et al., "High Frequency Trading Acceleration using FPGAs", International Conference on Field Programmable Logic and Applications, 2011, IEEE, (6 pages) Link: https://people.ucsc.edu/~hliltz/papers/hft_fpga.pdf.
John W. Lockwood et al., A low-latency library in FPGA hardware for High-Frequency Trading (HFT), Annual Symposium on High-Performance Interconnects, 2012, pp. 9-16, IEEE.

* cited by examiner

LOW-LATENCY FPGA FRAMEWORK BASED ON RELIABLE UDP AND TCP RE-ASSEMBLY MIDDLEWARE

PRIORITY CLAIM

This U.S. patent application claims priority under 35 U.S.C. § 119 to: India Application No. 202121007086, filed on Feb. 19, 2021. The entire contents of the aforementioned application are incorporated herein by reference.

TECHNICAL FIELD

The disclosure herein generally relates to a low-latency field programmable gate array (FPGA) framework, and, more particularly, to a low-latency FPGA framework based on reliable User Datagram Protocol (UDP) and Transmission Control Protocol (TCP) re-assembly middleware.

BACKGROUND

In recent years, the need for low-latency during communication in digital systems has increased drastically. Considering an example of financial markets/trading, many financial market participants implement strategies based on the most-up-to-date, or real time, market data that are often executed in few milliseconds after receiving the market data, wherein a few milliseconds can make a difference to a winning trade and a losing trade. Hence, low-latency communication/processing is an important requirement for financial markets/trading and several other digital systems like online booking, digital shopping during sale etc., Several tasks performed in financial markets/trading system include index computation, profit computation, alarm generation for pausing of trading activities for a specified duration based on market volatility, algorithmic trading, and so on.

The usage of FPGA in financial domain/trading platform is slowly gaining importance due to FPGAs customizable/re-usable nature. A FPGA is an integrated circuit that is highly customizable such that it may be configured by a designer or developer after manufacturing. Further a combination of FPGA and middleware framework can provides a low latency for applications by positively reducing the development time as most of the components can be re-used thus enabling a designer or a developer to focus on application functionality without worrying about implementing communications/messaging or memory requirements. Further, FPGAs have established themselves as one of the preferred digital implementation platforms including computational domain, financial domain, IoT domain, data center applications, high frequency trading algorithm for the high performance. Due to the aforementioned properties, FPGA's have assumed increased prominence in financial domains. However, enabling low latency in FPGA is still a topic where research is in progress.

SUMMARY

Embodiments of the present disclosure present technological improvements as solutions to one or more of the above-mentioned technical problems recognized by the inventors in conventional systems. For example, in one embodiment, a method for low-latency FPGA frame-work based on reliable UDP and TCP re-assembly middleware is provided. The method includes receiving a plurality of data packets as input from a plurality clients, wherein the plurality of data packets are associated with a digitally configured task to be performed for the client by the FPGA and the plurality of data packets enables one of a TCP and a UDP, wherein each data packet within the plurality of data packets comprises a channel sequence number indicative of the client. The method further includes assembling the plurality of data packets based on the channel sequence number. The method further includes identifying a missing channel sequence number in the assembled data packets (UDP) based on a pre-defined sequence; The method further includes performing, based on the identification of the missing channel sequence number in the assembled data packets (UDP), one of: on identifying presence of the missing channel sequence number in the assembled data packets (UDP), requesting a re-transmission of the data packets with the missing channel sequence number over a TCP channel based on a reliable UDP logic from the client to obtain a complete assembled data packets based on a TCP re-assembly logic; and on identifying absence of the missing channel sequence number in the assembled data packets, the assembled data packets to be retained as the complete assembled data packets. The method further includes extracting a plurality of relevant features from the complete assembled data packets using a domain knowledge base. The method further includes performing the digitally configured task associated with the data packet using the plurality of relevant features from the complete assembled data packets. The method further includes sharing the performed digitally configured task as an output to the client in response for the received data packets.

In another aspect, a system for low-latency FPGA framework based on reliable UDP and TCP re-assembly middleware is provided. The system comprises a Media Access Control (MAC)-TCP Offload Engine (TOE) module (MAC-TOE) configured for receiving a plurality of data packets as input from a plurality clients, wherein the plurality of data packets are associated with a digitally configured task to be performed for the client by the FPGA and the plurality of data packets enables one of a Transmission Control Protocol (TCP) and a User Datagram Protocol (UDP), wherein each data packet within the plurality of data packets comprises a channel sequence number indicative of the client. The system further includes a First In First Out (FIFO) configured for assembling the plurality of data packets based on the channel sequence number. The system further includes a reliable UDP module configured for identifying a missing channel sequence number in the assembled data packets (UDP) based on a pre-defined sequence and based on the identification, performing one of: identifying presence of the missing channel sequence number in the assembled data packets, requesting a re-transmission of the data packets with the missing channel sequence number over a TCP channel based on the reliable UDP logic from the client to obtain a complete assembled data packets in a TCP re-assembly middleware based on the TCP re-assembly logic and identifying absence of the missing channel sequence number in the assembled data packets, the assembled data packets to be retained as the complete assembled data packets. The system further includes a filter module configured for extracting a plurality of relevant features from the complete assembled data packets using a domain knowledge base. The system further includes a task transaction module configured for performing the digitally configured task associated with the data packet using the plurality of relevant features from the complete assembled data packets and sharing the digitally configured task as an output to the client via the MAC-TOE module.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Complete Description of Embodiments

Clients usually connect over Transmission Control Protocol/Internet Protocol (TCP/IP) using data packets with the FPGA systems to service a request. In a scenario, the clients themselves may not be real users but high frequency engines within any domain (that includes finance, retail, health, so on) which place orders to utilize a sub second opportunity. Considering a scenario of a finance domain for trading purpose, the FPGA must continually respond to the client's request with low latencies as this can translate to millions of dollars of lost business. The clients typically have a standard IP (TCP/UDP) interface, wherein TCP is a connection oriented protocol, while UDP is connectionless protocol. The TCP provides error checking support and hence this make TCP more reliable as compared to UDP. On other hand UDP is faster but may not be reliable. The UDP is inherently unreliable as the UDP does not provide any functionality to identify/request for re-transmission of any missing sequence. Hence a hybrid combination of UDP and TCP may enable the FPGA to respond faster for each request from the client, in the order of microseconds for large burst of incoming requests of the order of million orders per second. The TCP architecture may to allow for a low-latency, while still retaining the error checking support.

Referring now to the drawings, and more particularly to FIG. 1 through FIG. 5 where similar reference characters denote corresponding features consistently throughout the figures, there are shown preferred embodiments and these embodiments are described in the context of the following exemplary system and/or method.

Figure 1:
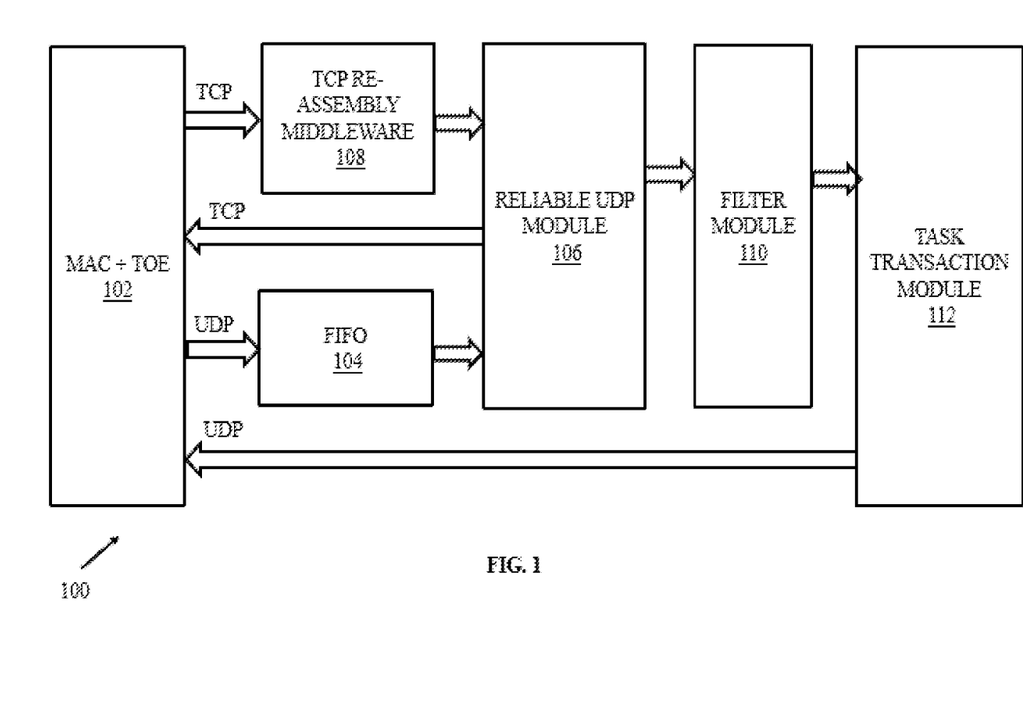
FIG. 1 illustrates an exemplary block diagram of a low-latency
FPGA framework based on reliable User Datagram Protocol (UDP) and Transmission Control Protocol (TCP) re-assembly middleware, according to some embodiments of the present disclosure.

FIG. 1 illustrates an exemplary FPGA system 100 for an exemplary block diagram of a low-latency FPGA framework based on reliable UDP and TCP re-assembly middleware according to some embodiments of the present disclosure.

As depicted in FIG. 1, the disclosed architecture of the FPGA system 100 is structured to enable low-latency. The low-latency during communication with clients is achieved due to a reliable UDP component and a TCP re-assembly middleware. The FPGA system 100 is a hybrid system that can process both TCP and UDP requests. The TCP provides error checking support hence making TCP more reliable as compared to UDP. On other hand UDP is faster but may not be reliable. The UDP is inherently unreliable as the UDP does not provide any functionality to identify/request for re-transmission of any missing sequence. Hence the latency for processing TCP is higher compared to UDP. Considering Can u the latency, the proposed system 100 generally uses UDP over TCP. However, UDP is not entirely reliable, hence in case of a missing sequence in UDP, the system 100 requests re-transmission of the missing sequence over a TCP channel. Therefore, TCP processing is utilized only in few cases where the UDP fails. Further, the disclosed system proposes to lower the latency for TCP by disclosing a TCP re-assembly middleware architecture. The TCP re-assembly middleware is an independent middleware that is a modular and a plug-play independent middleware extrinsic to an application layer (that is configured to implement a specific functionality) but within the FPGA modular architecture, wherein the TCP re-assembly middleware operationally connects the TOE and the reliable UDP. The TCP re-assembly middleware receives the missing channel sequence number from the TOE and the output of the TCP re-assembly middleware is sent to the reliable UDP. Hence the usage a combination of both TCP and UDP based on the reliable UDP component and the TCP re-assembly middleware enables a low-latency for the disclosed FPGA framework of system 100.

A plurality of data packets is received as input from a plurality client. The plurality of data packets is associated with a digitally configured task to be performed for the client by the FPGA. The client is an entity comprising a digital platform to perform a digitally configured task. In an example scenario the client can be a trading entity such National Stock Exchange (NSE), Bombay Stock exchange (BSE), New York Stock Exchange (NYSE) and so on from finance/trading domain or a digital shopping center from a retail domain or an online airlines reservation system from a travel domain. The digitally configured task comprises processing real-time streaming complex digital data, for example index computation for a trading entity from a trading domain and a mobile phone reservation device for an online shopping center during a mega sale event for retail domain.

The plurality of data packets enables one of a TCP and a UDP, wherein each data packet within the plurality of data packets comprises a channel sequence number indicative of the client).

As depicted in FIG. 1, the system 100 for low-latency FPGA framework based on reliable UDP and TCP re-assembly middleware includes a MAC-TOE module (102) configured for receiving a plurality of data packets as input from a client. The system 100 further includes a first-in-first-out (FIFO) (104) configured for assembling the plurality of data packet based on the channel sequence number. The system 100 further includes a reliable UDP module (106) configured for identifying a missing channel sequence number in the assembled data packet (UDP) based on a pre-defined sequence, wherein upon the identification of the missing channel sequence number perform a reliable UDP logic to obtain a complete assembled data packet in a TCP re-assembly middleware (108) based on the TCP re-assembly logic. The system 100 further includes a filter module (110) configured for extracting a plurality of trading relevant features from the complete assembled data packet using a domain knowledge base. The system 100 further includes a task transaction module (112) configured for performing the digitally configured task using the plurality of trading relevant features from the complete assembled data packet based on the digitally configured task in the FPGA, wherein the trading application comprises of an index computation. Further the task transaction module (112) shares the performed trading application output to the trading entity via a Media Access Control Address (MAC)-TCP Offload Engine (TOE) module (102).

According to an embodiment of the disclosure, the FPGA system 100 of FIG. 1 includes the MAC-TOE module (102) configured for receiving a plurality of data packets as input from a client.

In an embodiment, the client comprises a trading entity of a trading platform or domain configured to process streaming financial market data. An example of a trading platform is the National Stock Exchange (NSE) or Bombay Stock Exchange (BSE) or New York Stock Exchange (NYSE).

The plurality of data packets are associated with a digitally configured task to be performed for the trading entity by the FPGA and the plurality of Data packets enables one of a TCP and a UDP, wherein each data packet within the plurality of Data packets comprises a channel sequence number indicative of a client of the trading entity.

Figure 2:
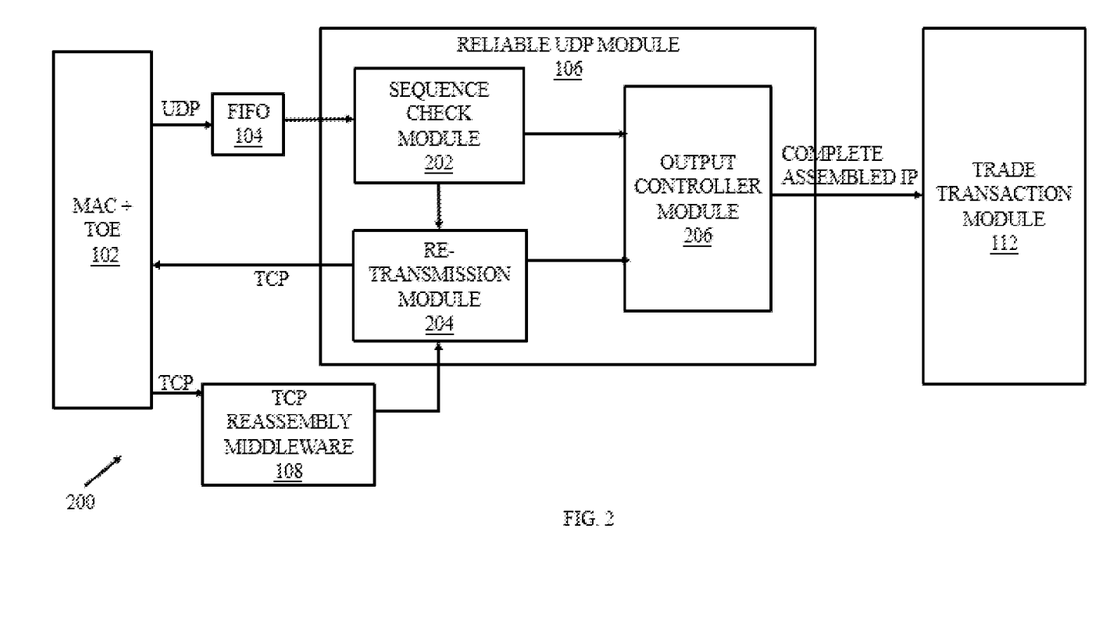
FIG. 2 illustrates a functional diagram of a reliable UDP within a low-latency FPGA framework, according to some embodiments of the present disclosure.

According to an embodiment of the disclosure, the FPGA system 100 of FIG. 1 further includes the reliable UDP module (106). The FIG. 2 illustrates a detailed functional diagram of the reliable UDP (106). The reliable UDP module (106) is configured for identifying a missing channel sequence number in the assembled data packet (UDP) based on a pre-defined sequence. Based on the identification:

On identifying presence of the missing channel sequence number in the assembled data packet, a re-transmission of the data packet is requested by the reliable UDP from the trading entity with the missing channel sequence number over a TCP channel based on a reliable UDP logic from the client to obtain a complete assembled data packet based on a TCP re-assembly logic; and On identifying absence of the missing channel sequence number in the assembled data packet, the assembled data packet to be retained as the complete assembled data packet.

As depicted in the architecture of the FIG. 2, the FIG. 2 illustrates the functions of the reliable UDP components of the system 100 for low latency trading. The detailed functional block diagram 200 of the reliable UDP (106) of the system 100 is explained in the FIG. 2. Although the exemplary architecture of the functional block diagram represents a certain number of components, it may be understood that the number is only representative and may be configured as desired. For ease of description, the description hereinafter may be limited to the number of components illustrated in the accompanying drawings. Each of the plurality of components within the reliable UDP (106) of the FPGA system 100 are configured to implement various functional units as described hereinafter.

Referring to the system 200 of FIG. 2, where the components of the reliable UDP (200) of the system 100 are illustrated. In accordance with the present disclosure, functional block diagram 200 of reliable UDP (106) of the system 200 includes a sequence check module (202), a re-transmission module (204) and an output controller module (206).

In one embodiment of the disclosure, the reliable UDP of system 200 includes the sequence check module (202) configured for checking the re-assembled UDP for a identifying the missing channel sequence number based on a pre-defined sequence. In an embodiment, the pre-defined sequence is associated with an initial number expected per channel, wherein the pre-defined sequence is defined to "n", where n is whole number, before reset of the FPGA system 100. Further based on the identification of the missing channel sequence number in the assembled data packet, the sequence check module(202) within the reliable UDP module (106) requests a re-transmission of the data packet with the missing channel sequence number over a TCP channel based on the reliable UDP logic_from the trading entity. The complete assembled data packet is obtained in the TCP re-assembly middleware (108) based on the TCP re-assembly logic, which is explained in the further sections. If however, the sequence check module (202) does not identify any missing channel sequence number/identify absence of the missing channel sequence number in the assembled data packet, the assembled data packet to be retained as the complete assembled data packet.

In one embodiment, the sequence check module (202) includes a read state machine that is configured to read a plurality of channel numbers from multi-channel FIFO queue to read received data from the corresponding channel. The sequence check module (202) down-counts an offset value and extracts 32-bit channel sequence number of the UDP. Upon extraction of the channel sequence number, the sequence check module (202) checks if a nxt_sequence_number_valid flag parameter in a exp_sequence_number memory for a channel is set. If the flag is reset (which means the sequence number should be compared with initial sequence number for that channel), it compares the sequence number with a initial sequence number. In case the flag matches with the initial sequence number, indicating that correct initial sequence number for that channel has been received in message, the next_sequence_number flag for that channel is set, return success flag in output queue and updates the exp_sequence_number for that channel in the exp_sequence_number memory. However, if the sequence number does not match with initial sequence number, then a difference is computed (received sequence number-programmed initial sequence number +1) for the missing channel sequence. Further for the missing channel sequence, a retransmission is to be scheduled.

Further in one embodiment of the disclosure, the reliable UDP of the system 200 includes the re-transmission module (204). The re-transmission module (204) is configured for scheduling of re-transmissions of channel sequence number on TCP and reception of messages with missing sequence numbers on TCP.

In one embodiment, the re-transmission module (204) reads the missing channel message sequence numbers and corresponding UDP channel numbers from sequence_channel_number_fifo populated by the sequence check module (202). Further the FIFO contains the start and end sequence numbers and UDP channel number of the messages with missing sequence numbers and finds out the corresponding TCP channel number and sends the TCP packet on that channel number for retransmission of that message. Packet contains the missing sequence number and the number of the UDP channel on which it was detected. In an example scenario, if the expected sequence number was 10 and received sequence number was 12, 12 is read out, sent to output with error flag set and start sequence number and end sequence number of 10 and 12 is written into retransmission FIFO along with UDP channel number, irrespective of whether message with sequence number 12 is in error or not).

Further in one embodiment of the disclosure, the reliable UDP of system 200 includes the output controller module (206). The output controller module (206) is configured to read message from internal queue and put it on output buffer. If data read from internal queue is with an end of message (EOM) set, then an output controller module (206) checks the channel sequence number. While checking for the channel sequence number, for a missing sequence data, the assembled data packet is assembled to obtain the complete assembled data packet. However, if the sequence number is not in sequence then an error bit is set while writing. Further, in case of out of sequence message, then the output controller module (204) waits for messages from retransmission block. Once all the missing messages are received from re-transmission module (204), the block resumes reading messages from internal queue.

The UDP messages are faster compared to TCP, the UDP may contain missing channel sequence number, hence the received UDP is checked for any missing sequence of fragments. The communication can be made reliable by using UDP over a TCP communication channel. Hence when the sequence check module (206) checks and identifies a missing channel sequence number, re-transmission of the missing sequence of re-assembled UDP is requested over a TCP channel that has communicated the data packet for a digitally configured task. The re-assembled UDP is transmitted over the TCP channel after encapsulating the missing channel sequence number of re-assembled UDP over TCP. Further it is to be noted that the TCP re-assembly middleware (108) is used only when a missing channel sequence number is identified, else the process continues only with the reliable UDP (106) unit.

Figure 3:
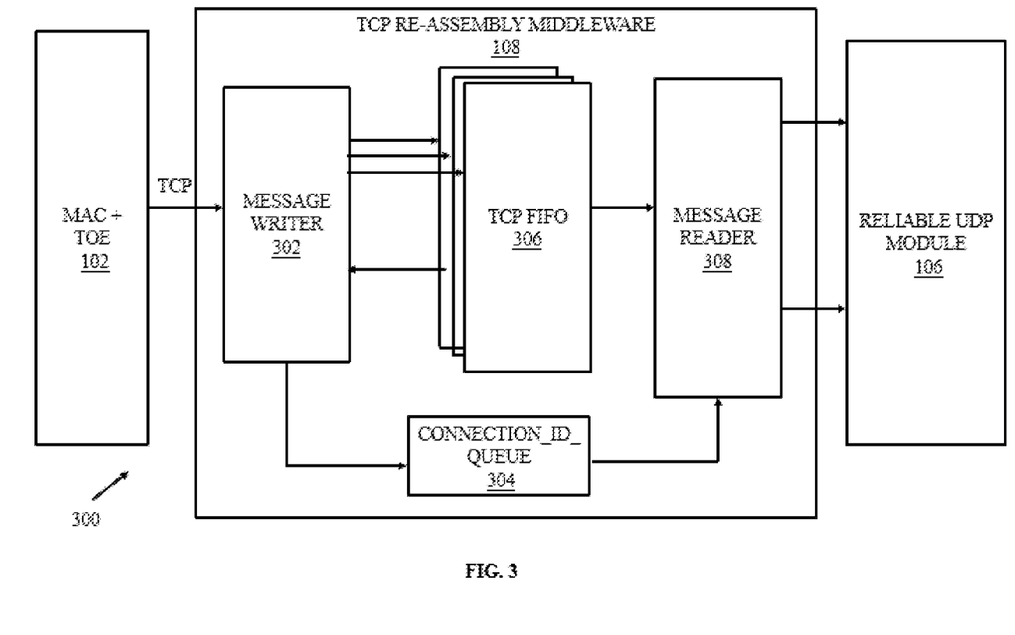
FIG. 3 illustrates a functional diagram of a TCP re-assembly middleware within a low-latency FPGA framework, according to some embodiments of the present disclosure.

Referring back to FIG. 1, according to an embodiment of the disclosure, the FPGA system 100 of FIG. 1 includes the TCP re-assembly middleware (108). The FIG. 3 illustrates a functional diagram of the TCP re-assembly middleware (108) within a low-latency FPGA framework. The TCP re-assembly middleware (108) is configured for receiving a re-transmission of the data packet with the missing channel sequence number over a TCP channel from the trading entity to obtain a complete assembled data packet based on a TCP re-assembly logic. Further it is to be noted that the TCP re-assembly middleware (108) is used only when a missing channel sequence number is identified, else the process continues only with the reliable UDP (106) unit.

As depicted in the functional diagram of the FIG. 3, the FIG. 3 illustrates the functions of the TCP re-assembly middleware (108) components of the system 100 for low latency trading. The detailed functional block diagram 300 of the TCP re-assembly middleware (108) of the system 100 is explained in the FIG. 3. Although the exemplary architecture of the functional block diagram represents a certain number of components, it may be understood that the number is only representative and may be configured as desired. For the ease of description, the description hereinafter may be limited to the number of components illustrated in the accompanying drawings. Each of the plurality of components within the TCP re-assembly middleware (108) in the FPGA system 100 as is configured to implement various functions as described hereinafter.

FIG. 3 is a functional block diagram 300 of the TCP re-assembly middleware of the system 100 of FIG. 1, in accordance with some embodiments of the present disclosure. The system 300 further includes the TCP re-assembly middleware (108) operationally connecting the MAC-TOE (102) and the reliable UDP(106). The TCP re-assembly middleware is an independent block within the FPGA modular architecture configured for implementation at the pre-defined frequency based on a memory optimization to process each of the TCP into complete assembled data packet.

In an embodiment, the TCP re-assembly middleware (108) is configured for converting the TCP (data packet) into the complete assembled data packet at pre-defined frequency based on a memory optimization. The pre-defined frequency is high frequency performance feature comprising of an FPGA implementation frequency of at least 300 MHz.

The memory optimization can be implemented on any memory within any components/units/modules within the system 100 to implement high frequency operations. In an embodiment, the memory optimization is implemented for a memory in a TCP FIFO, wherein the memory includes a message writer memory, a data segment memory, and a descriptor memory. The memory optimization includes the following configurations/features to be implemented to the memory in TCP re-assembly middleware (108) architecture of the system 300:

i) Registering an output for a memory, wherein registering is implemented by utilizing a register and an input controller at the output of the memory.
ii) Slicing the memory based on a pre-defined slicing threshold to enable the FPGA implementation at the pre-defined frequency, wherein the slicing includes a horizonal slicing and a vertical slicing.

In an embodiment, for the step of registering an output for the memory, a register and an input controller are placed at the output of the memory. Registering an output for the memory enables implementation at the pre-defined frequency by a) holding a data for one clock to synchronize the data for one clock cycle. B) Further by the process of registering the output of memory for two clock the FPGA system can be synthesized or implemented at the pre-defined frequency/higher frequency.

In an embodiment, the pre-defined slicing threshold is defined as slicing the memory optimally to enable implementation at the pre-defined frequency/higher frequency. The state of art FPGA systems uses 18 k bits and 38 k bit internal memory units to implement a large memory. If a larger memory is constructed using combination of this memories, it can cause a combinational delay there by decreasing the clock frequency. Hence, in accordance with embodiments of the present disclosure, by slicing the large memories to smaller blocks a positive impact is noted on performance of the functionality. Further, the vertical slicing should be implemented first followed by the horizontal slicing only if it does not meet the pre-defined frequency implementation as there is addition of small combinational circuit overhead in the horizontal slicing.

The slicing includes a horizonal slicing and a vertical slicing and the type of slicing to be implemented on the memory is decided based on the pre-defined slicing threshold. The pre-defined slicing threshold is dynamically determined based on the pre-defined frequency, wherein if the memory under consideration is not meeting the frequency expectation as defined by the pre-defined frequency, then the pre-defined slicing threshold is violated and this particular memory is be sliced.

As depicted in the functional diagram of the FIG. 3, illustrates the functions of the TCP re-assembly middleware component of the system 100 for processing the TCP (missing channel sequence number of UDP) into the complete assembled data packet on a TCP re-assembly logic. The functional block diagram 300 of the TCP re-assembly middleware (108) of the system 100 is explained in the below description. Although the exemplary functional block diagram represents a certain number of components, it may be understood that the number is only representative and may be configured as desired. For ease of description, the description hereinafter may be limited to the number of components illustrated in the accompanying drawings. Each of the plurality of components within the TCP re-assembly middleware (108) within the FPGA system 100 as various functional units as described hereinafter.

Referring to the components of the the TCP re-assembly middleware(108) of system 100 as explained in the FIG. 3, the TCP re-assembly middleware(108) includes a message writer (302) designed for implementation at the pre-defined frequency, wherein the message writer is configured to process the TCP to the complete assembled data packet based on a pre-defined message offset length. The pre-defined message offset length is indicative of length of the TCP segment as pre-defined by the client and the pre-defined format is indicative of an end of a TCP segment for the complete assembled data packet on the TCP re-assembly logic.

Further the TCP re-assembly middleware of the system 300 includes a connection Id queue (connection_id_queue) 304 configured to save a set of attributes of the complete assembled data packet. The set of attributes comprises of a channel-ID of the TCP, a message length, and a start of message. In an embodiment, connection id queue (304) is standard first in first out, with commit discard facilities. The connection id queue (304) receives its input from the message writer (304). The connection id queue (304) is configured to discard error segments and saving error free messages. The output of connection id queue (304) is read by a message reader (308).

Further the TCP re-assembly middleware of the system 300 includes a TCP First-In-First-Out (FIFO) (306) designed for implementation at the pre-defined frequency, wherein the TCP FIFO(306) is configured to receive, assemble and save the complete assembled data packet along with a set of control signals, wherein the complete assembled data packet is assembled along with the missing channel sequence number that is received over a TCP channel. The TCP FIFO (306) includes the memory, wherein the memory optimization is implemented. The memory optimization includes registering an output for a memory and slicing of the memory to enable low-latency performance of the system 100.

Further the TCP re-assembly middleware of the system 300 includes a message reader (308) designed for implementation at the pre-defined frequency, wherein the message reader is configured to read the complete application layer message from the FIFO in a pre-defined format based on the set of attributes from the connection id queue 304.

Referring back to FIG. 1, according to an embodiment of the disclosure, the FPGA system 100 of FIG. 1 further includes the filter module (110). The filter module (110) is configured for extracting a plurality of trading relevant features from the complete assembled data packet using the domain knowledge base.

In an embodiment, the domain knowledge base is an exhaustive knowledge base that is dynamically updated with a plurality of trading domain related knowledge. Further, the plurality of relevant features are extracted from the complete assembled data packet based on relevancy of the data packet for the digitally configured task based on the domain of the digitally configured task.

According to an embodiment of the disclosure, the FPGA system 100 of FIG. 1 further includes the task transaction module (112). The task transaction module (112) is configured for performing the digitally configured task. The digitally configured task is performed using the plurality of trading relevant features from the complete assembled data packet based on the digitally configured task in the FPGA. The digitally configured task comprises of an index computation, a profit computation, an alarm generation for pausing of trading activity for a specified duration based on market volatility.

In an embodiment, the index computation includes computing an index parameter based on a plurality scripts traded by the trading entity. Further, the profit computation includes computing a difference between a selling rate and a buying rate of same of quantity and same script. Further the alarm generation for pausing of trading activity for a specified duration based on market volatility includes sharing an alert with the client/trading entity based market volatility, wherein the market volatility is decided based on a threshold of the index parameter computed based on the index computation. The market trading activities are paused for specific duration based on the alert/market volatility.

Upon performing the trading application, the output is shared with the trading entity via the MAC-TOE module (102) by the task transaction module (112).

The various modules of the system 100 for a low-latency FPGA framework based on reliable UDP and TCP re-assembly middleware are implemented as atleast one of a logically self-contained part of a software program, a self-contained hardware component, and/or, a self-contained hardware component with a logically self-contained part of a software program embedded into each of the hardware component that when executed perform the above method described herein.

Figure 4A:
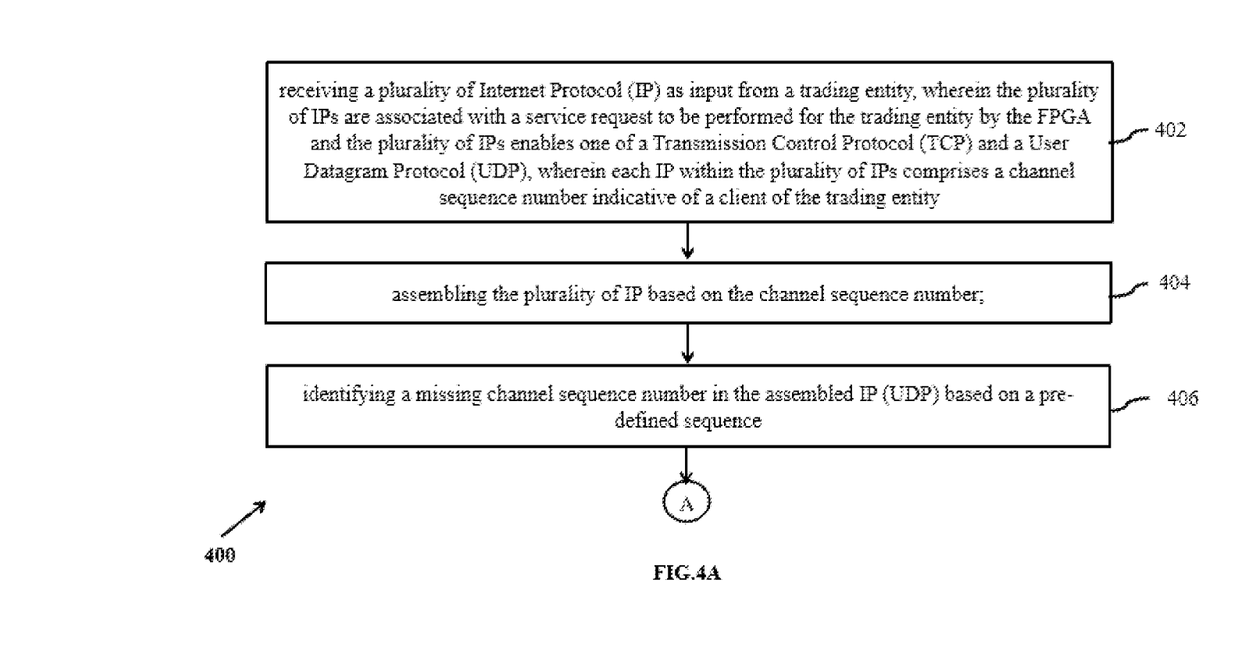
FIG. 4A, FIG. 4B and FIG. 4C is a flow diagram illustrating a method using the system of FIG. 1 (the low-latency FPGA framework based on the reliable UDP and the TCP re-assembly middleware) according to some embodiments of the present disclosure.
Figure 4B:
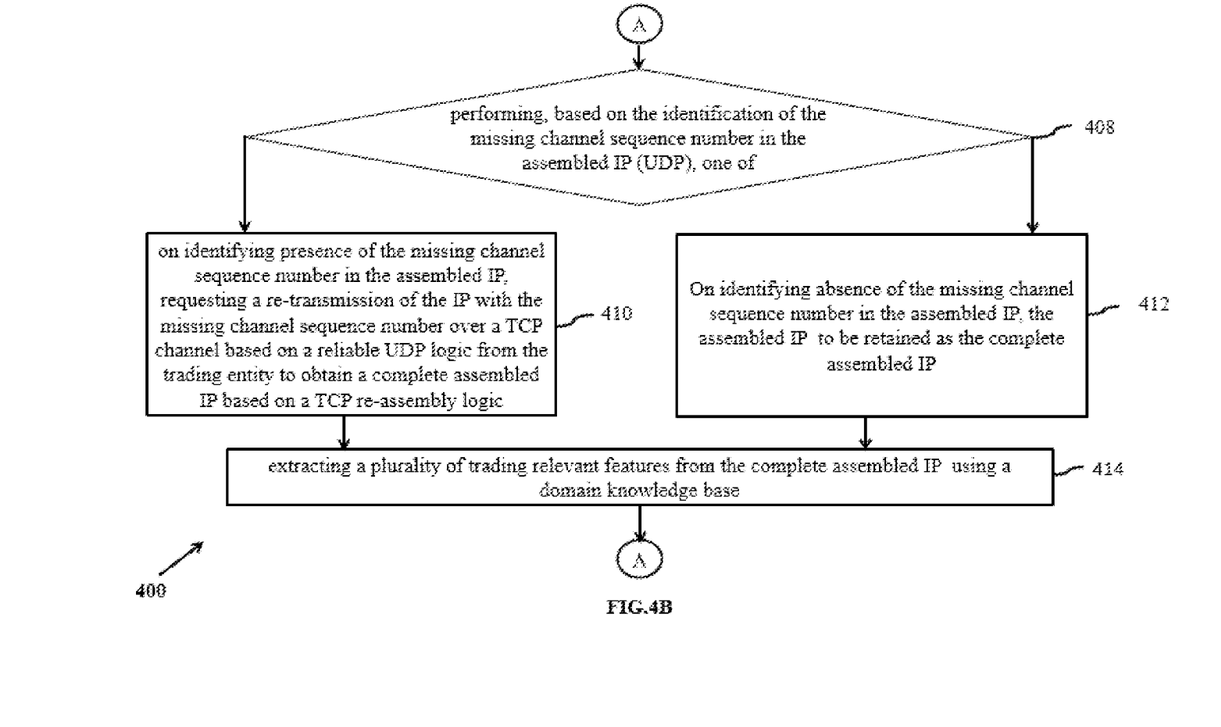
Figure 4C:
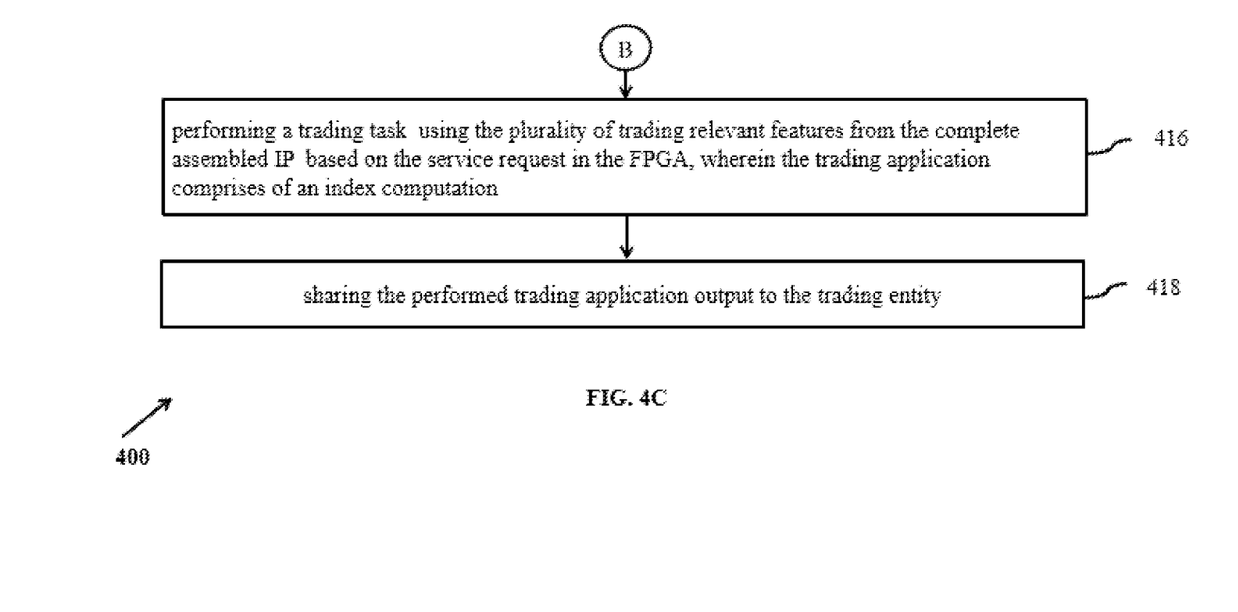

Functions of the components of the system 100 are explained in conjunction with functional modules of the system 200 and system 300 as depicted in FIG. 2 and FIG. 3 and further explained in conjunction with flow diagram of FIG. 4A, FIG. 4B and FIG. 4C. The FIG. 4A, FIG. 4B and FIG. 4C with reference to FIG. 1, FIG. 2 and FIG. 3, is an exemplary flow diagram illustrating a method 400 for using the system 100 of FIG. 1 according to an embodiment of the present disclosure.

The steps of the method of the present disclosure will now be explained with reference to the components of a low-latency FPGA framework based on reliable UDP and TCP re-assembly middleware as depicted in FIG. 1 and the modules (102-112). Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 402 of the method (400), the method includes receiving a plurality of data packets as input from a client at the MAC-TOE module (102).

The plurality of data packets is associated with a digitally configured task to be performed for the client by the FPGA. The plurality of data packets enables one of a Transmission Control Protocol (TCP) and a User Datagram Protocol (UDP), wherein each data packet within the plurality of data packets comprises a channel sequence number indicative of the client.

In an embodiment, the client comprises of an entity configured to process streaming digital data. In an example scenario, the client includes a trading entity from a trading platform. An example of a trading platform is the National Stock Exchange (NSE).

At the next step 404 of the method (400), the method includes assembling the plurality of data packet based on the channel sequence number.

At the next step 406 of the method (400), the method includes identifying a missing channel sequence number in the assembled data packet (UDP) in the First In First Out (FIFO) (104). The missing channel sequence number is identified based on a pre-defined sequence.

In an embodiment, the pre-defined sequence is pre-defined in the client and the FPGA 100 based on a client requirement.

At the next step 408 of the method (400), the method includes performing, based on the identification of the missing channel sequence number in the assembled data packet (UDP), one of 410 or 412.

At the next step 410 of the method (400) based on step 408, upon identifying a missing channel sequence number in the reliable UDP module (106), a re-transmission of the data packet with the missing channel sequence number over a TCP channel based on the reliable UDP logic is requested from the client to obtain a complete assembled data packet based on the TCP re-assembly logic in the TCP re-assembly middleware (108).

In an embodiment, the reliable UDP logic comprises requesting a re-transmission of the data packet with the missing channel sequence number over a TCP channel after encapsulating the data packet with the missing channel in the UDP over the TCP. Further the TCP re-assembly logic comprises converting the TCP (data packet) into the complete assembled data packet at pre-defined frequency based on a memory optimization, and wherein the pre-defined frequency is high frequency performance feature comprising of an FPGA implementation frequency of at least 300 MHz. It is to be noted that TCP re-assembly middleware (108) is used only in the absence of the missing channel sequence number else the process continues with the reliable UDP (106).

At the next step 412 of the method (400) based on step 408, upon identifying absence of the missing channel sequence number in the assembled data packet, the assembled data packet to be retained as the complete assembled data packet in the reliable UDP module (106).

At the next step 414 of the method (400), the method includes extracting a plurality of relevant features from the complete assembled data packet in the filter module (110). The filter module (110) enables extraction of the plurality of relevant features from the complete assembled data packet using the domain knowledge base.

In an embodiment, the domain knowledge base is an exhaustive knowledge base that is dynamically updated with a plurality of domain related knowledge based on the client. In a scenario, the domain knowledge base is a trading domain knowledge base that includes plurality of trading domain related knowledge based on the trading entity (client) like NSE, BSE and NYSE.

At the next step 416 of the method (400), the method includes performing a digitally configured task using the plurality of relevant features from the complete assembled data packet in the task transaction module (112). The digitally configured task includes the index computation, the profit computation, the alarm generation for pausing of trading activity for a specified duration based on a market volatility, an algorithmic trading. In an embodiment the market volatility is the variation of trading price in a trading application/market, and algorithmic trading is a method of executing trading orders using a set of automated pre-programmed trading algorithms/programs.

Figure 5:
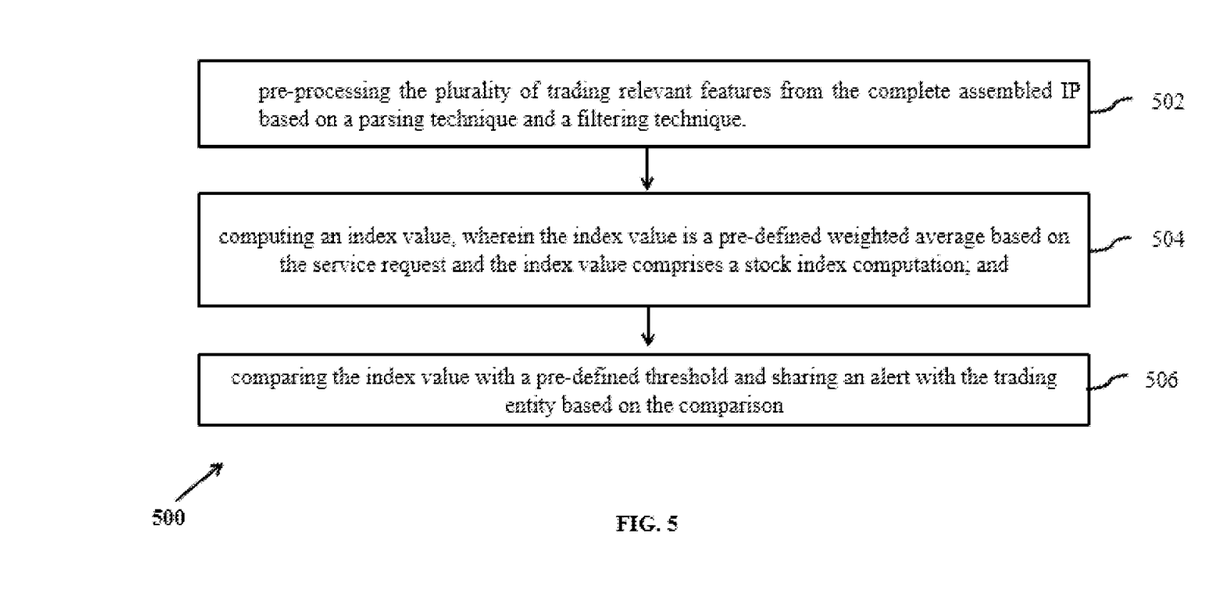
FIG. 5 is a flow diagram illustrating a method for index computation using the system of FIG. 1 according to some embodiments of the present disclosure.

In an embodiment, referring to FIG. 5 wherein the method (500) for performing the index computation is explained. The method 500 includes:

At step 502 of the method (500), the method includes pre-processing the plurality of relevant features from the complete assembled data packets based on a parsing technique and a filtering technique.

In an embodiment, the incoming data packets/packets are parsed and filtered with the data packets that are not defined as trade packets or order packets. Upon identifying the incoming IP/data packets as an order packet, the order packet is discarded, however if the data packet is a trade packet, then the data packet is sent for further processing or to perform the trade task.

At step 504 of the method (500), the method includes computing an index value. In an embodiment, the index value is a pre-defined weighted average based on the digitally configured task and the index value comprises a stock index computation.

In an embodiment, the computation of stock index is as expressed below:

$$\text{Stock Index} = \frac{\sum_{k=1}^{K} W_k X_k}{\sum_{k=1}^{K} W_k}$$

where,
K is a plurality of securities,
$W_k$ weight for a particular security k, and
$X_k$ is a weighted average price for a security (k) from K, where the weighted average price is expressed as shown below:

$$X_k = \frac{\sum_{i=1}^{N} P_i V_i}{\sum_{i=1}^{N} V_i}$$

where,
$P_i$ is a trade price of trade i,
$V_i$ is a trade volume of a trade i, and
N is a number of trades for a particular stock.

At step 506 of the method (500), the method includes comparing the index value with a pre-defined threshold and sharing an alert with the client based on the comparison.

Referring back to FIG. 4, the next step 418 of the method (400) includes sharing the performed trading application output to the client. The trading application output is the digitally configured task performed for the client by the FPGA 100.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Experimental Results:

Experiments are conducted using disclosed low-latency FPGA framework is compared against state of art techniques that are implemented using a state-of-art FPGA. The experiment has been conducted for two digitally configured task (for a trading or finance domain) that includes the index computation and an incremental logic.

For experimental purposes: for the state of art FPGA the experiment is considered for data packet flow between MAC-TOE and trade transaction module for TCP, while for the disclosed low-latency FPGA framework, the data packet flow is considered through, MAC-TOE, FIFO, Reliable UDP (and TCP Re-assembly only for missing sequence—which would be 1 in 100000—negligible), filter module and trade transaction module for UDP and TCP based on the experiment conducted, the breakdown (break up of clock cycles) of the delay that represents latency is provided as below:

Index Computation using the disclosed low-latency FPGA framework:

34(MAC-TOE)+10(FIFO)+5(R-UDP)+2(Filter module)+92(trade transaction module)+34(MAC-TOE)=177

Index Computation using the state of art FPGA:

67(MAC-TOE)+2(Filter module)+105(trade transaction module) +64(MAC-TOE)=238

Incremental logic using the disclosed low-latency FPGA framework:

34(MAC-TOE)+10(FIFO)+5(R-UDP)+2(Filter module)+1(trade transaction module)+34(MAC-TOE)=86

Incremental logic using the state of art FPGA :

67(MAC-TOE)+2(Filter module)+1(trade transaction module)+64(MAC-TOE)=134

| | Clock cycle | |
|---|---|---|
| | Disclosed low-latency FPGA framework (clock cycles) | State of art - FPGA (clock cycles) |
| Application - Index computation | 177 | 238 |
| Application - Incremental logic | 86 | 134 |

Hence based on the experimental can be said that the disclosed low-latency FPGA framework gives a performance speed of 61 clock cycle, more than 36% in case of incremental logic and more than 25% in index compute application It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description.

Alternative boundaries can be defined so long as the specified functions and relation data packets thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A Field Programmable Gate Array (FPGA) implemented method for a low-latency FPGA frame-work based on reliable User Datagram Protocol (UDP) and Transmission Control Protocol (TCP) re-assembly middleware:
   receiving a plurality of data packets as input from a plurality clients, wherein the plurality of data packets are associated with a digitally configured task to be performed for the client by the FPGA and the plurality of data packets enables one of a TCP and a UDP, wherein each data packet within the plurality of data packets comprises a channel sequence number indicative of the client;
   assembling the plurality of data packets based on the channel sequence number; identifying a missing channel sequence number in the assembled data packets based on a pre-defined sequence;
   performing, based on the identification of the missing channel sequence number in the assembled data packets:
      on identifying presence of the missing channel sequence number in the assembled data packets, requesting a re-transmission of the assembled data packets with the missing channel sequence number over a TCP channel based on a reliable UDP logic from the client to obtain a complete assembled data packets based on a TCP re-assembly logic, wherein the TCP re-assembly logic comprises converting the data packets into the complete assembled data packets at a pre-defined frequency based on a memory optimization implemented for a memory in a TCP First-In-First-Out (FIFO), wherein the memory includes a message writer memory, a data segment memory, and a descriptor memory,
   wherein memory optimization implemented to the memory in a TCP re-assembly middleware architecture includes:
      i. registering an output for a memory, wherein registering is implemented by utilizing a register and an input controller placed at the output of the memory, wherein registering the output for the memory enables implementation at the pre-defined frequency by:
         a. holding a data for one clock to synchronize the data for one clock cycle;
         b. the process of registering the output of memory for two clock, the FPGA is synthesized or implemented at the pre-defined frequency;
      ii. slicing the memory based on a pre-defined slicing threshold to enable a FPGA implementation at the pre-defined frequency, wherein the slicing includes a horizontal slicing and a vertical slicing; and on identifying absence of the missing channel sequence number in the assembled data packets, the assembled data packets to be retained as the complete assembled data packets;
   extracting a plurality of relevant features from the complete assembled data packets using a domain knowledge base;
   performing the digitally configured task using the plurality of relevant features from the complete assembled data packets; and
   sharing the performed digitally configured task as an output to the client in response for the received data packets.

2. The method of claim 1, wherein the client is an entity comprising a digital platform to perform a digitally configured task, wherein the digitally configured task comprises processing real-time streaming complex digital data.

3. The method of claim 1, wherein the reliable UDP logic comprises requesting a re-transmission of the data packets with the missing channel sequence number over a TCP channel after encapsulating the data packets with the missing channel in the UDP over the TCP.

4. The method of claim 1, wherein the pre-defined frequency is high frequency performance feature comprising of an FPGA implementation frequency of at least 300 MHz.

5. The method of claim 1, wherein the domain knowledge base is a knowledge base that is dynamically updated with a plurality of domain related knowledge based on the client.

6. The method of claim 1, wherein the digitally configured task for a trading or finance domain comprises a digitally configured task that includes an index computation, a profit computation, an alarm generation for termination of trading activities based on market volatility and an algorithmic trading.

7. The method of claim 1, wherein the index computation comprises:
   pre-processing the plurality of trading relevant features from the complete assembled data packets based on a parsing technique and a filtering technique;
   computing an index value, wherein the index value is a pre-defined weighted average based on the digitally configured task and the index value comprises a stock index computation; and
   comparing the index value with a pre-defined threshold and sharing an alert with the client based on the comparison.

8. A Field Programmable Gate Array (FPGA) system configured to execute instructions for a low-latency FPGA frame-work based on reliable User Datagram Protocol (UDP) and Transmission Control Protocol (TCP) re-assembly middleware, wherein the system is configured to:
   receive a plurality of data packets as input from a plurality clients, wherein the plurality of data packets are associated with a digitally configured task to be performed for the client by the FPGA and the plurality of data packets enables one of a TCP and a UDP, wherein each data packet within the plurality of data packets comprises a channel sequence number indicative of the client;
   assemble the plurality of data packets based on the channel sequence number;
   identify a missing channel sequence number in the assembled data packets based on a pre-defined sequence and based on the identification, performing:
      on identifying presence of the missing channel sequence number in the assembled data packets, requesting a re-transmission of the assembled data packets with the missing channel sequence number over a TCP channel based on the reliable UDP logic from the client to obtain a complete assembled data packets in a TCP re-assembly middleware based on the TCP re-assembly logic, wherein the TCP re-assembly logic comprises converting the data packets into the complete assembled data packets at a pre-defined frequency based on a memory optimization implemented for a memory in a TCP First-In-First-Out (FIFO), wherein the memory includes a message writer memory, a data segment memory, and a descriptor memory, wherein memory optimization implemented to the memory in a TCP re-assembly middleware architecture includes:
  i. registering an output for a memory, wherein registering is implemented by utilizing a register and an input controller placed at the output of the memory, wherein registering the output for the memory enables implementation at the pre-defined frequency by:
    a. holding a data for one clock to synchronize the data for one clock cycle;
    b. the process of registering the output of memory for two clock, the FPGA is synthesized or implemented at the pre-defined frequency;
  ii. slicing the memory based on a pre-defined slicing threshold to enable a FPGA implementation at the pre-defined frequency, wherein the slicing includes a horizontal slicing and a vertical slicing; and on identifying absence of the missing channel sequence number in the assembled data packets, the assembled data packets to be retained as the complete assembled data packets;

extract a plurality of relevant features from the complete assembled data packets using a domain knowledge base; and perform the digitally configured task using the plurality of relevant features from the complete assembled data packets; and share the digitally configured task as an output to the client.

9. The system of claim 8, wherein the one or more hardware processors are configured by the instructions to implement the reliable UDP logic, wherein a re-transmission of the data packets is requested with the missing channel sequence number over a TCP channel after encapsulating the data packets with the missing channel in the UDP over the TCP.

10. The system of claim 8, wherein the pre-defined frequency is high frequency performance feature comprising of an FPGA implementation frequency of at least 300 MHz.

11. The system of claim 8, wherein the domain knowledge base is an exhaustive knowledge base that is dynamically updated with a plurality of domain related knowledge based on the client.

12. The system of claim 8, wherein the one or more hardware processors are configured by the instructions to implement index computation wherein:
  the plurality of trading relevant features is pre-processed from the complete assembled data packets based on a parsing technique and a filtering technique;
  an index value is computed, wherein the index value is a pre-defined weighted average based on the digitally configured task and the index value comprises a stock index computation; and
  the index value is compared with a pre-defined threshold and sharing an alert with the client based on the comparison.

* * * * *